United States Patent
Priem et al.

(10) Patent No.: US 6,226,012 B1
(45) Date of Patent: May 1, 2001

(54) METHOD AND APPARATUS FOR ACCELERATING THE RENDERING OF GRAPHICAL IMAGES

(75) Inventors: Curtis Priem, Fremont; David Kirk, San Francisco, both of CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 09/053,998

(22) Filed: Apr. 2, 1998

(51) Int. Cl.$^7$ .................. G06T 11/00; G06T 11/40; G06T 15/00
(52) U.S. Cl. .................. 345/433; 345/430; 345/419
(58) Field of Search .................. 345/426, 427, 345/430, 431, 433, 441, 422, 419, 425, 423, 147, 149, 439

(56) References Cited

U.S. PATENT DOCUMENTS

| | | | |
|---|---|---|---|
| 4,835,712 | * 5/1989 | Drebin et al. | 345/423 |
| 4,855,934 | * 8/1989 | Robinson | 345/425 X |
| 5,001,651 | * 3/1991 | Rehme et al. | 364/518 |
| 5,175,806 | * 12/1992 | Muskovitz | 345/425 |
| 5,214,753 | * 5/1993 | Lee et al. | 345/425 |
| 5,224,208 | * 6/1993 | Miller et al. | 345/425 |
| 5,455,900 | * 10/1995 | Shiraishi et al. | 345/441 |
| 5,856,829 | * 1/1999 | Gray et al. | 345/422 |

* cited by examiner

Primary Examiner—Mark R. Powell
Assistant Examiner—Chanté Harrison
(74) Attorney, Agent, or Firm—Oppenheimer, Wolff & Donnelly, LLP; Claude A. S. Hamrick; Justin F. Boyce

(57) ABSTRACT

A method which evaluates each sequence of pixels provided in a polygon to determine whether the pixels vary linearly, selects sequences of adjacent pixels which vary linearly, determines a processing factor for the sequence of pixels, processes only every one of a selected number of pixels of the sequence, and interpolates the data for pixels of the sequence between the processed pixels after the processed pixels have been processed.

21 Claims, 3 Drawing Sheets

METHOD AND APPARATUS FOR ACCELERATING THE RENDERING OF GRAPHICAL IMAGES

BACKGROUND OF THE INVENTION

1. Field Of The Invention

This invention relates to computer systems, and more particularly, to methods and apparatus for accelerating the rendering of images to be reproduced on a computer output display.

2. History Of The Prior Art

In three dimensional graphics, surfaces are typically rendered by assembling a plurality of polygons into a desired shape. The polygons are conventionally triangles having vertices which are defined by three dimensional coordinates in world space, by color values, and by texture coordinates. The color values define the brightness of each of red/green/blue (r, g, b) colors at each vertex and thus the color at each vertex. The texture coordinates (u, v) define the positions of each vertex on a texture map stored in memory. The texture map is a matrix of values which describe colors at intersections of the texture coordinates. The placement of the color values in the matrix describes a pattern which when applied to the surface of the triangle varies the colors in accordance with the pattern. Other characteristics such as fog, transparency, spectral colors, and additional textures may also define each vertex in a particular system to provide more sophisticated rendering.

The surfaces represented by an assembly of polygons are, as a generality, being viewed in perspective. In order to display a surface, the vertices of each triangle must be positioned in two dimensional screen space and the pixels which describe the entire triangle determined. Then the characteristics (attributes) for each of the pixels may be determined for each pixel.

The positions of the vertices of each triangle may be furnished in screen space or world space. If furnished in world space, the three dimensional world space coordinates are transformed into screen coordinates in which horizontal and vertical values (x, y) define screen position and a depth value z determines how near a particular vertex is to the screen and thus how and whether that vertex is viewed with respect to other points at the same screen coordinates. This may be accomplished by a perspective transformation algorithm well known to those skilled in the art. The other attributes are almost always furnished by an application program in world space.

It is a simple matter to determine the x and y coordinates of each pixel defining a triangle if the screen space coordinates of the vertices are known because the pixel positions are distributed linearly from vertex to vertex in screen space. However, all of the other attributes are distributed linearly across the triangle in world rather than screen space. Consequently, attributes accurately defining each pixel in two dimensional screen space may be determined from the linear distribution of those attributes at positions across the surface of the triangle in world space and the perspective transformation of values at those positions to the pixel positions in screen space.

Thus, the depth of the vertices of a triangle vary linearly in world space from one to the other vertex within the triangle. This allows the depth value for any position in the triangle to be determined in world space. The depth of each pixel which defines the triangle projected onto the screen may then be determined by perspective transformation of the world depth values using algorithms well known to those skilled in the art. Similarly, the color values and the texture coordinates for each pixel defining the triangle vary linearly from vertex to vertex in world space and so may be used to find the color values and texture coordinates for each pixel.

Once the values of all of the attributes for each pixel have been determined in screen space, the texture coordinates are utilized to determine texture values from the texture map for each pixel. Determining the texture values of each pixel in a triangle accurately is a lengthy process. The texture coordinates u and v of each pixel provide an index into a map of texture values typically stored in memory which describe colors at the individual coordinates and thereby define a particular texture pattern that is to be applied in world space to the surface of the triangle. The texture value is then used with the other attribute values to generate a color value for that pixel of the triangle.

Since each individual screen pixel describing the triangle covers some portion of the texture map as it is projected onto the screen, each screen pixel will cover some one or more texture values (texels) on the projected triangle. Texture coordinates obtained by processes combining linear interpolation and perspective transformation are not typically integer values. On the other hand, indexing into a texture map is accomplished using integral coordinates. There are a number of methods used in the prior art to derive texture values from the u and v values. A simple method of obtaining texture values uses the closest integral u and v values for each pixel obtained by either rounding or truncating to select the texture value at that intersection. A more accurate method of representing the texture pattern called bilinear interpolation utilizes the integer portion of the u and v coordinates for each pixel to determine four additional sets of integral texture coordinates surrounding the position of the original set of coordinates, uses those four sets to index into the texture map to obtain four texture values, and then utilizes the fractional portion of the original texture coordinates to weight the four texture values derived. These weighted values are combined and blended into a more accurate representation for modifying each pixel color value to reproduce the texture pattern.

However, those skilled in the art have recognized that where a pixel covers a very large number of texels on a texture map, only a small portion of those values will be represented in the final texture value selected to modify the color of that pixel using the bilinear interpolation method. Consequently, a more accurate method of texture mapping has been devised. The method provides a plurality of texture maps for each texture at different scales so that by selecting a map of the correct scale the pixels defining the individual triangles may be made to cover relatively constant numbers of texels. This allows most of the texels to used in reaching a final texture value for any pixel and provides a more accurate color representation. The process of selecting a texture value for a pixel then includes an initial step for each particular triangle being rendered in which a texture map is selected having a scale adapted to accurately represent texture values for the pixels of that triangle. One process for choosing a texture map of a correct scale is described in a paper entitled "Pyramidal Parametrics," presented at Siggraph Proceedings, 1984.

In order to make the scale selection process even more accurate, an additional process by which texture maps of the two scales closest to a desired size are selected and the texture values provided by those two different texture maps are interpolated to provide values closer to the desired scale.

Although these methods render pixels progressively more accurately on the screen if the triangle lies in a plane parallel to the screen surface, each of these methods is based on the assumption that the projection of a pixel onto the texture map is square or rectangular in shape. This assumption is incorrect in the greater number of cases when three dimensional shapes are being rendered. If the vertices of the triangle being mapped are at significantly different depths, the pixels describing a scan line are warped and of different sizes when projected onto the triangle. None of these methods is capable of describing with sufficient accuracy the texture values which should be attributed to the pixels when three dimensional shapes are rendered in any significant perspective on a flat screen surface.

Consequently, a new process has been developed which evaluates and combines texture values at a plurality of positions within each pixel. The positions are determined by deriving a large number of sets of texture coordinates by a process which evaluates the change in each of the texture coordinates sets to the change in pixel dimensions from one pixel to the next adjacent pixel in both the horizontal and vertical directions. Some method determining a texture value is utilized at each of the plurality of positions determined by a set of texture coordinates, and the resulting values are blended to provide a final texture value for each pixel. Evaluating texture values at a plurality of positions within a pixel provides a more accurate texture color representation.

The steps required to accomplish these manipulations in order to produce perspective correct pixel attributes are so complex that the processes have not been accomplished in hardware prior to the present invention.

Whatever the process used to determine texture values, once the texture values have been determined for any pixel, all of the attributes such as r, g, b, texture value, fog, and spectral r/g/b for that pixel are combined to produce a color for that pixel in the rendering pipeline. The manipulations by which this combination is accomplished are also quite complicated since they require evaluating the attributes with respect to one another.

As will be appreciated by those skilled in the art, the steps required to determine the final color values for each pixel in the rendering pipeline are very complicated and time consuming. Consequently, one way to accelerate the rendering process to a speed at which a useful output may be produced for display is to produce a number of pixels in parallel. However, each pixel produced in parallel requires its own circuitry for accomplishing the combination of attributes. The need for this circuitry greatly increases the complication, size, and expense of the circuitry.

It is desirable to provide apparatus and a method for rapidly rendering pixels representing perspective correct three dimensional shapes to the frame buffer at the lowest possible cost.

SUMMARY OF THE INVENTION

The present invention is realized by apparatus and a method which evaluate each sequence of pixels provided in a polygon to determine whether the pixels vary linearly, selects sequences of adjacent pixels which vary linearly, determines a processing factor for the sequence of pixels, processes only every one of a selected number of pixels of the sequence, and interpolates the data for pixels of the sequence between the processed pixels after the processed pixels have been processed.

The objects and features of the invention will be better understood by reference to the detailed description which follows taken together with the drawings in which like elements are referred to by like designations throughout the several views.

DETAILED DESCRIPTION

Figure 1:
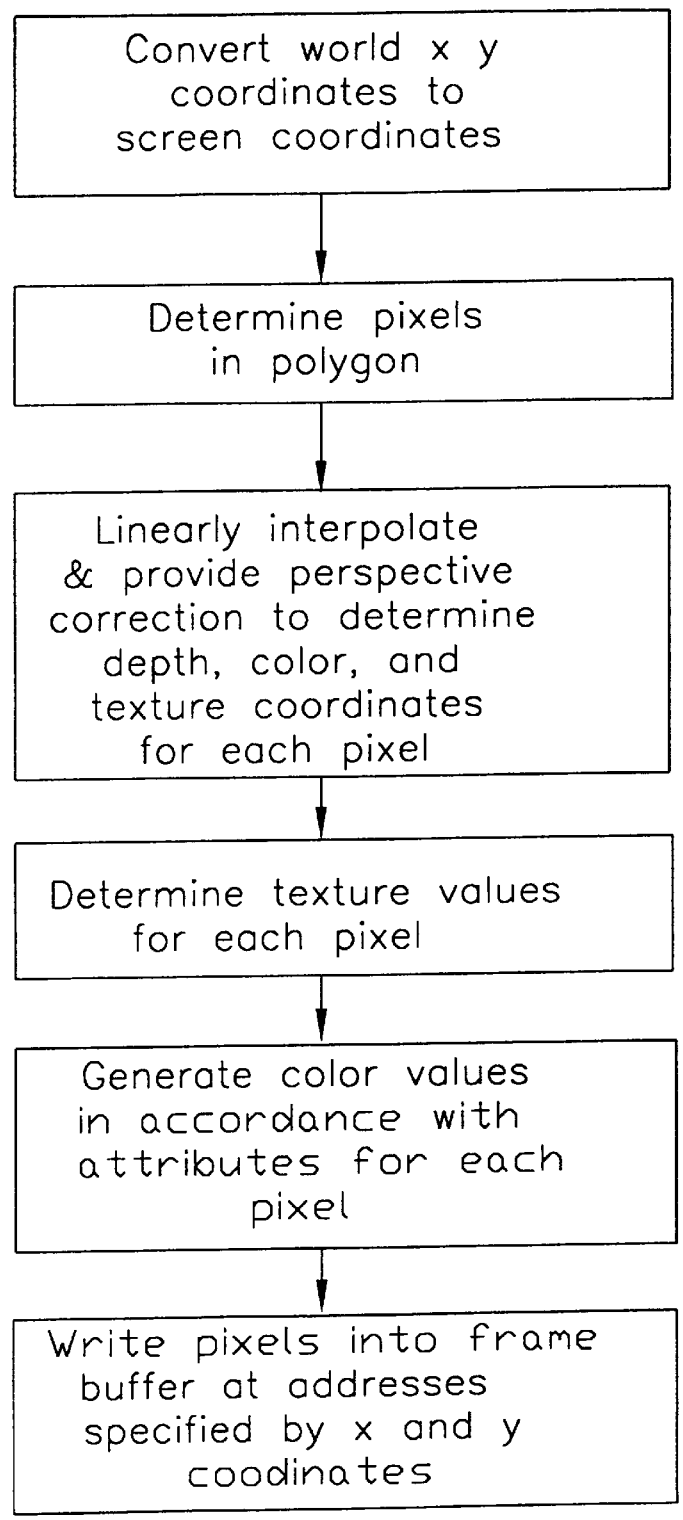
FIG. 1 is a flow chart illustrating the steps necessary for rendering pixels to the frame buffer in a three dimensional graphics accelerator designed to provide perspective correct rendering.

FIG. 1 is a diagram illustrating the steps for processing values for each pixel being sent to the frame buffer using a graphics accelerator designed to accomplish such operations. It should be understood that such a graphics accelerator did not exist as herein described until the present invention.

In a first step, the three dimensional coordinates of the vertices of a particular polygon are furnished to a rasterizing engine which initiates a set up sequence in which those pixels which are to be described in order to render the polygon on the screen are first determined. This set up requires a conversion of the three dimensional x and y world coordinates (if the x and y dimensions are provided in world coordinates) into screen coordinates and a positioning of the screen coordinates of the vertices in order to determine the pixels encompassed within the polygon (triangle).

The pixels are, as pointed out above, linear in screen space so those pixels which describe the triangle may be determined (see step two) if the vertices are known. Once the pixels included in the triangle are known, a complex process (illustrated as step 3) evaluates the r/g/b color, texture coordinates, depth, and any other attributes of each pixel at the coordinates of each pixel. For perspective correct values, the process must both evaluate each of the attributes in the world space of the triangle where the attributes vary linearly and apply perspective correction to world space values in order to produce screen space values for each pixel included in the triangle.

A linear interpolation process may be used to determine the triangle attributes in world space because the triangle forms a plane in world space and any line connecting positions assigned known values lying in that plane may be divided into some number of equally-spaced positions each of which varies from the preceding position by the difference between the positions with known values divided by the number of positions on the line. The perspective transformation process is a triangulation process by which the attributes are mapped back to each of the pixels which define the triangle in screen space.

Circuitry and a process have been created which accomplish the complex operations involved in producing screen values for each of the attributes for each pixel of each triangle. The circuitry sets up a number of values which remain constant across the triangle and utilizes these constant values with x and y values of each pixel to determine the attributes for each pixel. The circuitry is described in an application Ser. No. 09/046,240, entitled *Method and Apparatus for Producing Perspective Correct Graphical Images*, Curtis Priem, filed Mar. 23, 1998, and assigned to the assignee of the present invention.

Figure 2:
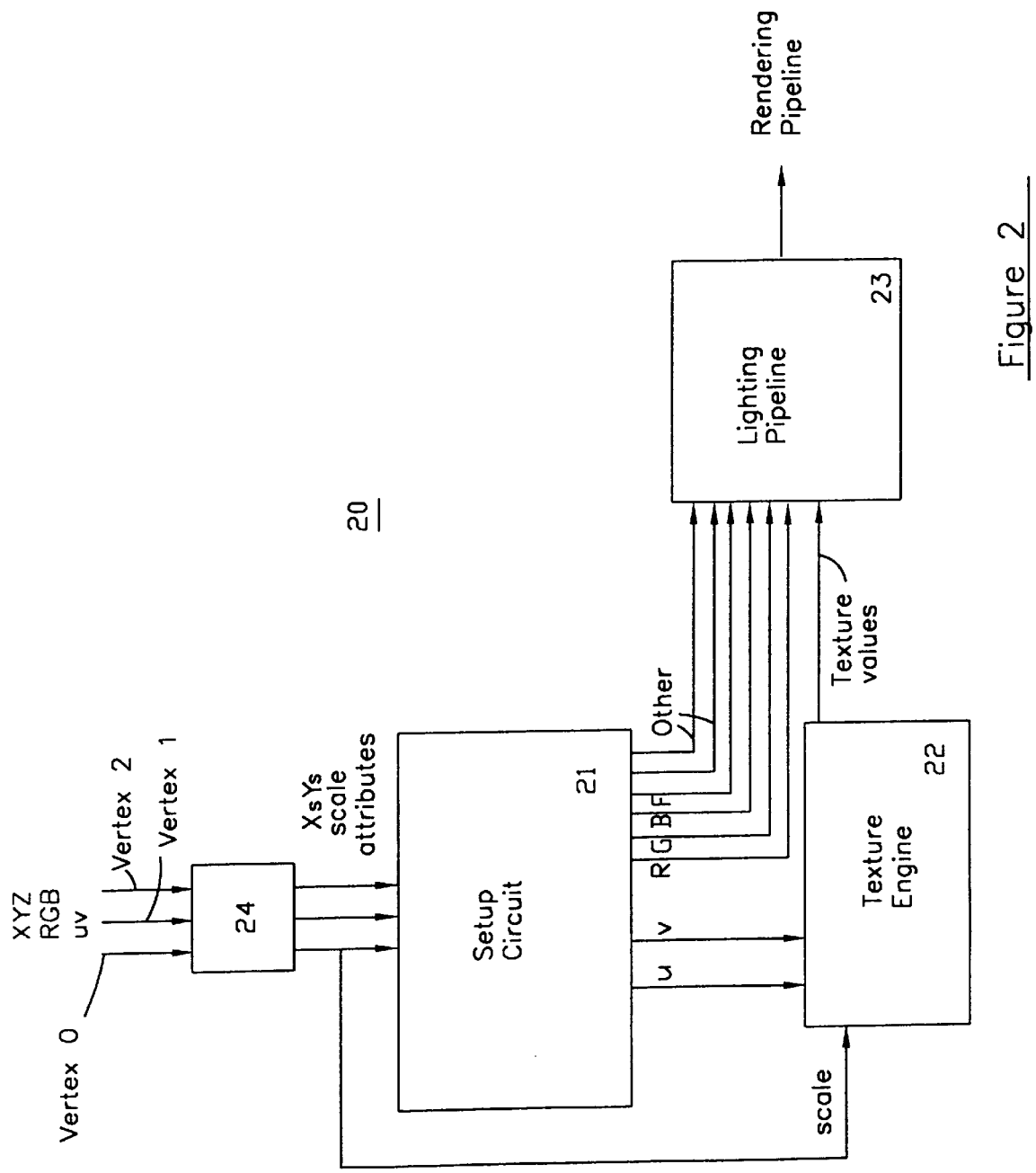
FIG. 2 is a block diagram illustrating a circuit for generating pixels for display on an output display device.

One embodiment described in the patent application may be carried out by the circuit of FIG. 2. The circuit 20 includes a setup engine 21 which receives input values for the various attributes defining the three vertices of any triangular surface being depicted. Before transfer to the setup engine 21, the x, y, u, and v values at the vertices of the triangle are processed by a scaling circuit 24 which receives the x, y, u, and v values at the vertices of the triangle and utilizes the maximum and minimum values of each to determine a proper scale for a texture map in a manner known to those skilled in the art. The x, y, and z coordinates may be provided by an application program as either screen space or world space values. The change from world space to screen space is based on a perspective transformation process utilizing the following equations for conversion:

$$Xs=(H/S)*(X/Z);/*-1.0 \text{ to } 1.0*/$$

$$Ys=(H/S)*(Y/Z);/*-1.0 \text{ to } 1.0*/$$

$$M=(H/S)*(1/Z);/*1/S \text{ to } H/S/F*/$$

where, H is the distance from the viewer to the center of the screen; S is half of either the width or height of the screen; F is the distance from the eye to the far clip plane, and the field of view in degrees is 2*arctangent (S/H).

The circuit 24 may also determine the pixels within a triangle from the x and y screen values at the vertices and generate specific screen x and y values for these pixels. The circuit 21 utilizes the x, y, and z screen values of the vertices to determine screen values for each of the attributes of each pixel in a triangle. One particular process of computing perspective-correct screen values for the attributes from world space vertex values is expressed by the geometric relationship:

$$E_s=(AX+BY+C)/(DX+EY+F),$$

where $E_s$ is the screen value of the particular attribute at the pixel defined by the X Y coordinates; and A, B, C, D, E, and F are constants over the triangle which depend on various dimensions of the triangle in screen and world space and the values of the attributes at the vertices in world space.

One specific sequence of operations which provide accurate perspective translations rapidly from world space to screen space for a number of attributes when the values X and Y in the basic formula are screen values are as follows:
Where:
A, B, C, D, E, F are the coefficients of the basic relationship
Xs0, Xs1, Xs2 Screen Coordinates of vertices
Ys0, Ys1, Ys2 Screen Coordinates of vertices
Zs0, Zs1, Zs2 Screen Z Buffer Coordinates of vertices
M0, M1, M2 Screen Z Buffer Coordinates of vertices
R0, R1, R2 World Red Lighting of vertices
G0, G1, G2 World Green Lighting of vertices
B0, B1, B2 World Blue Lighting of vertices
U0, U1, U2 Texture Coordinates of vertices
V0, V1, V2 Texture Coordinates of vertices
Input: Xs, Ys Screen Coordinates of pixels
  Triangle Presetup

| Triangle Presetup | |
|---|---|
| ad0 = Ys1-Ys2; | psu0 = Xs1*Ys2; |
| ad1 = Ys2-Ys0; | psu1 = Xs2*Ys1; |
| ad2 = Ys0-Ys1; | psu2 = Xs2*Ys0; |
| be0 = Xs2-Xs1; | psu3 = Xs0*Ys2; |
| be1 = Xs0-Xs2; | psu4 = Xs0*Ys1; |
| be2 = Xs1-Xs0; | psu5 = Xs1*Ys0; |
| cf0 = psu0-psu1; | adm0 = ad0*M0; |
| cf1 = psu2-psu3; | adm1 = ad1*M1; |

| -continued | |
|---|---|
| cf2 = psu4-psu5; | adm2 = ad2*M2; |
| | bem0 = be0*M0; |
| | bem1 = be1*M1; |
| | bem2 = be2*M2; |
| | cfm0 = cf0*M0; |
| | cfm1 = cf1*M1; |
| | cfm2 = cf2*M2. |

Triangle Setup

| | | |
|---|---|---|
| D = adm0 | +adm1 | +adm2; |
| E = bem0 | +bem1 | +bem2; |
| F = cfm0 | +cfm1 | +cfm2; |
| Zz = cf0 | +cf1 | +cf2; |
| Az = ad0*Zs0 + ad1*Zs1 + ad2*Zs2; | | |
| Bz = be0*Zs0 + be1*Zs1 + be2*Zs2; | | |
| Cz = cf0*Zs0 + cf1*Zs1 + cf2*Zs2; | | |
| Au = adm0*U0 + adm1*U1 + adm2*U2; | | |
| Bu = bem0*U0 + bem1*U1 + bem2*U2; | | |
| Cu = cfm0*U0 + cfm1*U1 + cfm2*U2; | | |
| Av = adm0*V0 + adm1*V1 + adm2*V2; | | |
| Bv = bem0*V0 + bem1*V1 + bem2*V2; | | |
| Cv = cfm0*V0 + cfm1*V1 + cfm2*V2; | | |
| Ar = adm0*R0 + adm1*R1 + adm2*R2; | | |
| Br = bem0*R0 + bem1*R1 + bem2*R2; | | |
| Cr = cfm0*R0 + cfm1*R1 + cfm2*R2; | | |
| Ag = adm0*G0 + adm1*G1 + adm2*G2; | | |
| Bg = bem0*G0 + bem1*G1 + bem2*G2; | | |
| Cg = cfm0*G0 + cfm1*G1 + cfm2*G2; | | |
| Ab = adm0*B0 + adm1*B1 + adm2*B2; | | |
| Bb = bem0*B0 + bem1*B1 + bem2*B2; | | |
| Cb = cfm0*B0 + cfm1*B1 + cfm2*B2; | | |
| Per Pixel operations: | | |
| | | |
| Dd = D *Xs + E *Ys + F; | | |
| Zn = (Az*Xs + Bz*Ys + Cz)/Zz; /*screen*/ | | |
| Zn = ( Zz)/Dd; /*world*/ | | |
| Un = (Au*Xs + Bu*Ys + Cu)/Dd; | | |
| Vn = (Av*Xs + Bv*Ys + Cv)/Dd; | | |
| Rn = (Ar*Xs + Br*Ys + Cr)/Dd; | | |
| Gn = (Ag*Xs + Bg*Ys + Cg)/Dd; | | |
| Bn = (Ab*Xs + Bb*Ys + Cb)/Dd; | | |

As will be understood by those skilled in the art, this sequence of steps may be implemented by well known gating circuitry which carries out the addition, subtraction, multiplication, and division steps indicated to produce perspective correct screen values for each of the attributes at each pixel position.

The texture coordinates provided by the setup engine 21 are transferred to a texture engine 22. The texture engine 22 utilizes those input values to determine texture coordinates at a plurality of positions within each pixel in accordance with the foregoing discussion of the invention. For example, the texture engine 22 may translate the texture coordinates at each of a plurality of positions within a pixel into texture values at those positions and blend the texture values to realize a final texture value for each pixel. This final texture value is transferred to a lighting pipeline 23 where the texture value and the other various attributes from the setup circuit 21 are utilized to modify the color value of the particular pixel in the sequence of pixels utilized to describe the triangle. From the lighting pipeline, the pixels are transferred to the rendering pipeline.

Rather than carrying out the process for generating the screen values for each pixel to be displayed in the manner of FIG. 2, the present invention utilizes a number of fast modes in which exact pixel values are generated for only some of the pixels on a scan line. The values of intervening pixels on the scan line are determined by a process of linear interpolation. Because of this, it is not necessary (as it has been with typical with prior art graphics accelerators) for frame buffers to be constantly waiting for a next pixel to be generated. The present invention significantly accelerates the process by which pixels are generated and written to the frame buffer. In fact, the present invention reduces the average time to generate a pixel to one-half, one-quarter, or less of the time required by prior art graphics accelerators to generate pixels for a triangle.

The process of the present invention reduces the delay in pixel generation by detecting characteristics of sequences of pixels being rendered on a scan line during the setup process. When rendering the pixels of a polygon to a frame buffer utilizing a graphics accelerator designed in the manner described above, sequences of pixels may occur in which the attributes of adjacent pixels and especially the texture values vary linearly. It has been found that this condition will occur where the perspective does not change too abruptly and where the rate of change of texture values is not too great. Heretofore, the rendering circuitry has proceeded through its relatively complicated and, more importantly, time consuming algorithmic sequence in order to generate the correct attribute values for modifying the color values assigned to each pixel using the prior art techniques. In rendering pixels in a sequence, the process of relating attributes in world space to attributes in screen space, using the texture coordinates in screen space to accomplish texture mapping, and combining the attribute values to determine a color value for each pixel has been extremely time consuming. Consequently, if the time required for this processing could be reduced, the time required to render polygons could be significantly reduced.

When the attributes and especially the texture values are varying linearly across a particular scan line, there is often no reason to proceed through an exhaustive algorithm such as that described above in order to determine pixel attribute values by which the color values are modified. The time required to convert world attributes to screen attributes and to carry out the texture mapping process may be significantly reduced by limiting the calculation of attributes to some number of half or less of the pixels in a linear sequence. It is often sufficiently accurate to simply interpolate attribute values between these accurately determined values rather than utilizing the more rigorous methods. Linear interpolation takes very much less time and thus provides the ability to greatly accelerate the process of generating pixels for writing to the frame buffer. If only every other pixel, or every third, fourth, fifth, or some other higher number of pixels (indicated by a processing factor) in a sequence has its attribute values accurately computed using the methods described above or some other accurate method of determining attributes and texture values, and the values of the pixels between the accurately determined pixels are determined using linear interpolation, the time for rendering pixels in such a sequence can be reduced to essentially one-half, one-third, one-fourth, one-fifth, or some smaller number depending of the fraction of pixels which are produced by linear interpolation.

Figure 3:
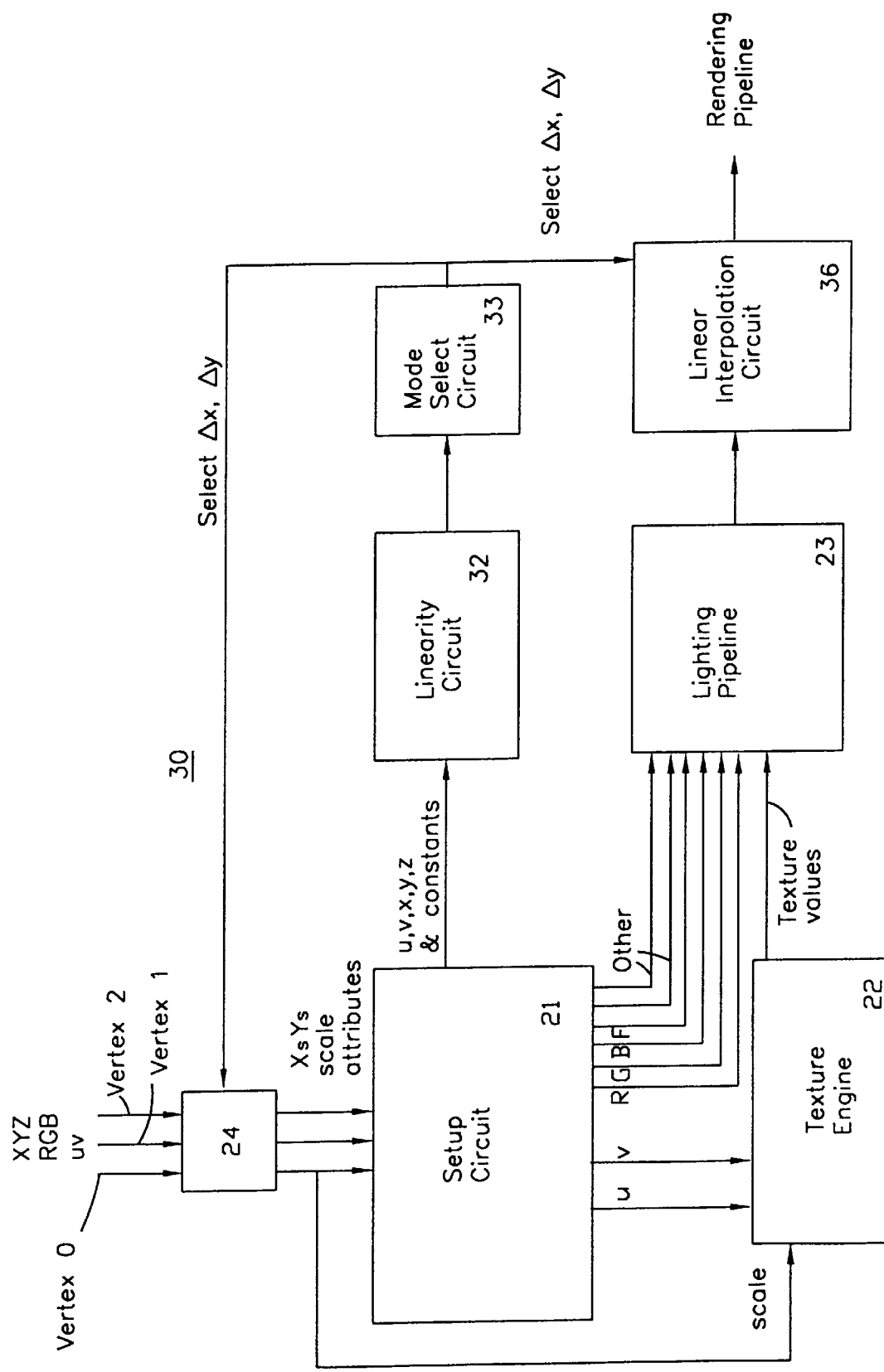
FIG. 3 is a block diagram illustrating a circuit for practicing the present invention.

Using the present invention, illustrated in FIG. 3, allows pixels to be generated more rapidly than those pixels may be written to the frame buffer.

The manner in which the present invention accomplishes this acceleration is to detect whether the rate of change of attributes and especially of texture are essentially linear. A linearity circuit 32 receives the vertex data provided to a setup circuit 21 and the constants generated by the circuit 21 as input signals. The circuit 32 compares the change in the texture coordinates to the changes in pixels positions across a scan line. If the change in texture coordinates is small per pixel, then the texture attributes are considered to be varying linearly. If the texture attributes are varying linearly, then the ability of the circuit 21 to produce attribute values at selectable x and y screen coordinates is utilized to generate perspective correct values utilizing the precise process for only selected pixels on a scan line.

This may be better understood by considering the relationship of texels and pixels. A pixel defines a position at which a single color is placed to display one position in a triangle. A texel represents a single value which may be used to determine which single color a pixel displays. If a pixel covers a number of texels, then many different texels should be evaluated to determine a final color for the pixel. If a pixel covers approximately one texel, then that texel might be the only texel considered in determining the color for that pixel; however, a different texel covered by the next pixel might be an entirely different color. If, on the other hand, a pixel covers less than one texel then adjacent pixels probably have the same or very similar texture values since the color is assessed using the same texels. Consequently, by comparing the change in texture coordinates to the change in pixels over a scan line in a triangle (or some portion of a scan line or between the maximum and minimum x values in a triangle), a rate of change of one to the other may be determined which signifies that the change is linear.

The linearity of the pixels on a scan line may be determined in accordance with the following equations:

$$\delta u/\delta x = [(Au)/(DX+EX+F)] - [(AuX+BuY+Cu)D/(DX+EY+F)^2],$$

$$\delta v/\delta x = [(Av)/(DX+EX+F)] - [(AvX+BvY+Cv)D/(DX+EY+F)^2],$$

where the coefficients are those described above.

When the values resulting from the two equations are determined, the results are evaluated to provide a value which determines the mode in which to operate. In one embodiment, the results are added and if the sum is less than one-half, then mode two is selected; if the sum is less than one quarter, then mode four is selected. Other modes are possible in other embodiments.

The linearity circuit 32 may include circuitry which receives the u and v texture coordinates computed at the edges of each scan line of the triangle and determines a degree of linearity by determining the change of each u and v value with respect to the change of the x and y values for the scan line.

If texture is changing in a manner which is essentially linear, then one of the faster modes of generating pixels may be selected at a mode select circuit 33 based on the degree of linearity determined by the linearity circuit 32. In one embodiment of the invention, if the change in the texture coordinates from pixel to pixel on a scan line is less than one-half, then a fast mode is utilized. Specifically, if the change is less than one-half, then a processing factor indicating a fast mode of two is utilized; if the change is less than one-fourth, then a processing factor indicating a fast mode of four is utilized. A fast mode select input signal is provided by the mode select circuit 33 to the circuit 24 which generates x and y screen coordinates and to a linear interpolation circuit 36 to accomplish this. Although the different embodiments of the present invention actually increase the speed of pixel generation by two and four times; there is no theoretical reason that the speed cannot be increased by more by following the teachings of the present invention.

It should be noted that the changes in the u and v texture coordinates with respect to the changes in the pixel in the y direction may be computed in a similar manner by the linearity circuit 32 as are the changes in the u and v texture coordinates with respect to the changes in the pixel in the x direction using circuitry to accomplish the following steps:

$$\delta u/\delta y=[(Bu)/(DX+EX+F)]-[(AuX+BuY+Cu)E/(DX+EY+F)^2],$$

$$\delta v/\delta y=[(Bv)/(DX+EX+F)]-[(AvX+BvY+Cv)E/(DX+EY+F)^2],$$

where the coefficients are those described above.

The values which result may be evaluated to select modes for accomplishing linear interpolation of entire scan lines where changes in the y direction of the texture is linear.

If a faster mode is selected, then at the beginning of a scan line within a polygon, the pixels must be aligned to the mode. To do this in one embodiment, the value of the two dimensional coordinates of the first pixel are calculated in a pixel alignment circuitry of circuit 24. If the x value of a pixel is divisible by the value of the fast mode selected, then the mode may be started with the first pixel. If the x value is not divisible by the mode number, then the pixel position must be aligned for the mode. There are various manners of alignment as will be appreciated from the following description. However, essentially, the process requires that one or more pixels be treated individually by the alignment circuitry of the circuit 24 until the first pixel which is evenly divisible by the mode value is reached.

In a first embodiment, where a pixel position divisible by the mode number is but one pixel away from the start, a first mode is entered in which each pixel is individually computed. Thus, the first pixel is computed and its value entered in the pipeline. Then the next pixel is computed, and its value also entered in the pipeline. Then, the mode of computation is changed to a selected fast mode; and the pixel a mode value away (e.g., two or four pixels) is computed.

Attribute values are computed by the circuits 21 and 22 for the pixels on the scan line of a triangle. Once the values of the first pixel and some succeeding pixel (e.g., the second or fourth) are selected during this fast mode, the values of the intervening pixels are determined by linear interpolation of the values of the accurately-determined pixels at the linear interpolation circuit 36. For example, if the accurately-determined pixels are two apart in the sequence furnished to the circuit 36 from the lighting pipeline, the values determined through the combination of attribute values in the lighting pipeline 23 are added and divided by two to give the value for the intervening pixel. If the accurately-determined pixels are four pixels apart in the sequence, the values for those accurately-determined pixels are added and divided by two to give the central pixel between the two accurately-determined pixels. Then, the value of the central pixel is added to the value of the first pixel and divided by two to determine the value of the second pixel ; and the value of the central pixel value is added to the value of last pixel and divided by two to obtain the value of the third pixel in the sequence. Since the values of the beginning and end pixels determine the values of all of the intervening pixels, the values may be generated in sequence very rapidly. The two values last computed are then used to compute the one or three intervening values. The intervening values and the end value are placed in sequence in the rendering pipeline.

The process continues in the fast mode across the scan line computing only those pixels a mode value away using the slower more complicated process. The fast mode ends when pixels less than a mode value away remain to be computed. At this point, the operation switches to whatever mode provides computation of the next greatest number of pixels remaining in the scan line. For example, if two or three pixels remain to be calculated, the mode might change to mode two, compute a pixel two positions beyond in the sequence, linearly interpolate the intervening pixel, quit if no pixels remain to be computed on the scan line, or furnish the already computed value of the last pixel on the scan line to the pipeline if such a pixel remains.

In an alternative but slightly less accurate embodiment, the circuit 21 begins a scan line with the fastest mode available and then masks off the pixels not included in the scan line. This may be accomplished by including validity bits with the data stored in the pipeline to indicate which pixels are to be written to the frame buffer. The technique is slightly less accurate because it may use texture values outside of the triangle in order to determine the values for any particular scan line.

In one embodiment of the invention, a given triangle is rendered in one faster mode or another. However, it would also be possible to utilize different modes of operation for different scan lines within any particular triangle. Moreover, as discussed above, linear interpolation between successive scan lines may also be utilized.

It will be understood by those skilled in the art that the present invention has been described as accelerating the speed with which pixel data is rendered to the frame buffer primarily because of the reduction in time and circuitry required to accomplish the generation of pixels through the complex process of determining accurate screen attributes from world attributes. However, similar advantages are obtained by utilizing the invention to eliminate other steps in the computation of values of individual pixels where the attributes of the pixels vary linearly along a scan line.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method for processing pixel data in a plurality of sequences of pixels defining a polygon comprising the steps of:

evaluating each sequence of pixels defining a polygon to determine whether particular attributes of the pixels vary substantially linearly with respect to changes in pixel positions, selecting a sequence of adjacent pixels having particular attributes which vary substantially linearly with respect to changes in pixel positions, determining a processing factor for the sequence of pixels, the processing factor indicating a selected number of pixels defining a fast pixel generating mode for the selected sequence, processing only every one of the selected number of pixels of the selected sequence in accordance with the defined fast pixel generating mode, and interpolating to determine data defining intermediate pixels of the selected sequence, the intermediate pixels being positioned between the processed pixels after the processed pixels have been processed.

2. The method of claim 1 in which the step of determining a processing factor for the sequence of pixels comprises:

determining a degree of linearity of the rate of change of texel values with respect to pixel coordinates along a scan line, wherein the selected number of pixels is determined based on the degree of linearity.

3. The method of claim 1 in which the selected number of pixels of the sequence is two.

4. The method of claim 1 in which the selected number of pixels of the sequence is four.

5. The method of claim 1 in which the selected number of pixels of the sequence is greater than zero.

6. The method of claim 1 wherein the pixels of each of the sequences of pixels are arranged horizontally.

7. The method of claim 1 wherein the pixels of each of the sequences of pixels are arranged vertically, and wherein the step of interpolating includes interpolating to determine data defining pixels of an entire scan line.

8. The method of claim 1 in which the step of determining a processing factor for the sequence of pixels comprises:

determining a degree of linearity of the rate of change of texel values with respect to pixel coordinates between the maximum and minimum values of a polygon, wherein the selected number of pixels is determined based on the degree of linearity.

9. A method for rendering pixel data to a frame buffer in a computer system comprising the steps of:

determining screen space attributes of the vertices of a polygon from world space attributes provided at vertices of the polygon, determining whether data defining a particular attribute of the polygon varies substantially linearly across the polygon from screen space attributes of the vertices of a polygon, deriving screen space attributes of selected pixels of a polygon from world space attributes provided at vertices of the polygon, if the data defining the particular attribute of the polygon does vary substantially linearly:

deriving attributes of selected pixels of the polygon by computing values precisely at a first pixel at a beginning of a sequence of pixels defining the polygon and at a second pixel a preselected number of pixels apart from the first pixel by linear interpolation, and deriving attributes of pixels of the polygon separating the pixels the attributes of which are computed precisely by linearly interpolating using attributes of the pixels of the polygon which are computed precisely.

10. A method as claimed in claim 9 comprising the further steps of:

if the data defining an attribute of the polygon does not vary linearly over a selected sequence:

deriving attributes of all pixels of the selected sequence of the polygon by computing the values precisely.

11. A method as recited in claim 9 in which the preselected number of pixels is determined based on on a degree of linearity of the particular attribute.

12. A circuit for rendering pixel data in a polygon defining a graphical shape comprising:

a circuit for determining a plurality of pixels in the polygon, a linearity circuit for evaluating each sequence of the pixels in the polygon to determine whether a particular attribute of the pixels vary substantially linearly with respect to changes in pixel positions, a mode select circuit responsive to the evaluation, and operative to generate a mode select signal indicative of a selected number of pixels defining a fast pixel generating mode for a selected sequence of adjacent pixels having particular attributes which vary substantially linearly, a setup circuit responsive to the mode select signal, and being operative to generate pixels precisely at only every one of the selected number of pixels of the selected sequence, and a linear interpolating circuit responsive to the mode select signal, and being operative to determine data associated with intermediate pixels of the selected sequence, the intermediate pixels being positioned between the precisely generated pixels.

13. A circuit as claimed in claim 12 wherein the evaluation provided by the linearity circuit indicates a degree of linearity of the particular attribute of the pixels, and wherein the selected number of pixels is determined by the mode select circuit based on the degree of linearity.

14. A circuit as claimed in claim 12 in which the circuit for generating pixels precisely at only every one of a selected number of pixels of the sequence is capable of generating every pixel, every other pixel, and every fourth pixel.

15. A circuit as claimed in claim 12 in which the circuit for generating pixels precisely at only every one of a selected number of pixels of the sequence is capable of generating a pixel at selected numbers greater than zero.

16. A circuit as claimed in claim 12 wherein the pixels of each of the sequences of pixels are arranged vertically, and wherein the step of interpolating includes interpolating to determine data defining pixels of an entire scan line.

17. A circuit as claimed in claim 12 wherein the pixels of each of the sequences of pixels are arranged horizontally.

18. The circuit of claim 12 wherein the particular attribute comprises texel values, and wherein the linearity circuit for evaluating each sequence of pixels provided in the polygon to determine whether the pixels vary linearly comprises: a circuit for determining the rate of change of texel values with respect to pixel coordinates along a scan line.

19. The circuit of claim 12 wherein the particular attribute comprises texel values, and wherein the linearity circuit for evaluating each sequence of pixels provided in the polygon to determine whether the pixels vary linearly comprises: a circuit for determining the rate of change of texel values with respect to pixel coordinates between the maximum and minimum values of a polygon.

20. The method of claim 1 wherein the particular attribute comprises texel values, wherein the step of evaluating each sequence of pixels comprises determining the rate of change of texel values with respect to pixel coordinates along a scan line.

21. The method of claim 1 wherein the particular attribute comprises texel values, and wherein the step of evaluating each sequence of pixels comprises determining the rate of change of texel values with respect to pixel coordinates between the maximum and minimum values of a polygon.

* * * * *